US009957992B2

(12) United States Patent
Noe et al.

(10) Patent No.: US 9,957,992 B2
(45) Date of Patent: May 1, 2018

(54) METHOD OF JOINING METAL STRIPS

(71) Applicants: Andreas Noe, Kerken (DE); Jens Hoffmann, Essen (DE); Friedhelm Ambaum, Xanten (DE)

(72) Inventors: Andreas Noe, Kerken (DE); Jens Hoffmann, Essen (DE); Friedhelm Ambaum, Xanten (DE)

(73) Assignee: BWG BERGWERK-UND WALZWERK-MASCHINENBAU GMBH, Duisburg (DE)

( * ) Notice: Subject to any disclaimer, the term of this patent is extended or adjusted under 35 U.S.C. 154(b) by 180 days.

(21) Appl. No.: 14/938,958

(22) Filed: Nov. 12, 2015

(65) Prior Publication Data

US 2016/0138636 A1    May 19, 2016

(30) Foreign Application Priority Data

Nov. 14, 2014   (DE) .......................... 10 2014 116 710

(51) Int. Cl.
| F16B 17/00 | (2006.01) |
| B21C 47/24 | (2006.01) |
| B21D 39/03 | (2006.01) |

(52) U.S. Cl.
CPC .......... *F16B 17/008* (2013.01); *B21C 47/247* (2013.01); *B21D 39/031* (2013.01)

(58) Field of Classification Search
CPC ........ Y10T 29/49936; Y10T 29/49924; Y10T 29/49908; Y10T 29/49938; Y10T 29/49945; Y10T 29/5198; Y10T 29/5197; Y10T 29/53996; B21D 39/03; B21D 39/031; B21B 38/04; B21B 15/0085; B21B 37/16; B21B 37/165
USPC ................................... 72/8.8, 11.5
See application file for complete search history.

(56) References Cited

U.S. PATENT DOCUMENTS

| 2,288,308 | A | * | 6/1942 | Williams | ............. | B21D 39/035 29/521 |
| 3,670,398 | A | * | 6/1972 | Minton | ................. | B21C 47/247 228/3.1 |
| 5,051,020 | A | * | 9/1991 | Schleicher | ........... | B21D 39/031 29/521 |
| 5,603,153 | A | * | 2/1997 | Zmyslowski | .......... | B21D 35/00 29/34 R |
| 6,213,381 | B1 | * | 4/2001 | Funamoto | ........... | B21B 15/0085 228/141.1 |
| 6,240,627 | B1 | * | 6/2001 | Schneider | ............ | B21D 39/031 29/283.5 |
| 8,109,428 | B2 | | 2/2012 | Noe | | |
| 2007/0029039 | A1 | | 2/2007 | Noe | | |
| 2015/0121678 | A1 | | 5/2015 | Noe | | |

* cited by examiner

*Primary Examiner* — Jason L Vaughan
*Assistant Examiner* — Amanda Meneghini
(74) *Attorney, Agent, or Firm* — Andrew Wilford

(57) ABSTRACT

A trailing end of a leading metal strip is joined to a leading end of a trailing metal strip by first overlapping the leading end of the trailing strip with the trailing end of the leading strip and then clinching the ends together at the overlap by pressing at least one punch of a joining tool into one of the strips at the overlap sufficiently to complementarily deform both of the strips. The thickness of the leading and trailing ends is measured and a depth of engagement of the punch into the strips is controlled in accordance with the measured thickness.

8 Claims, 3 Drawing Sheets

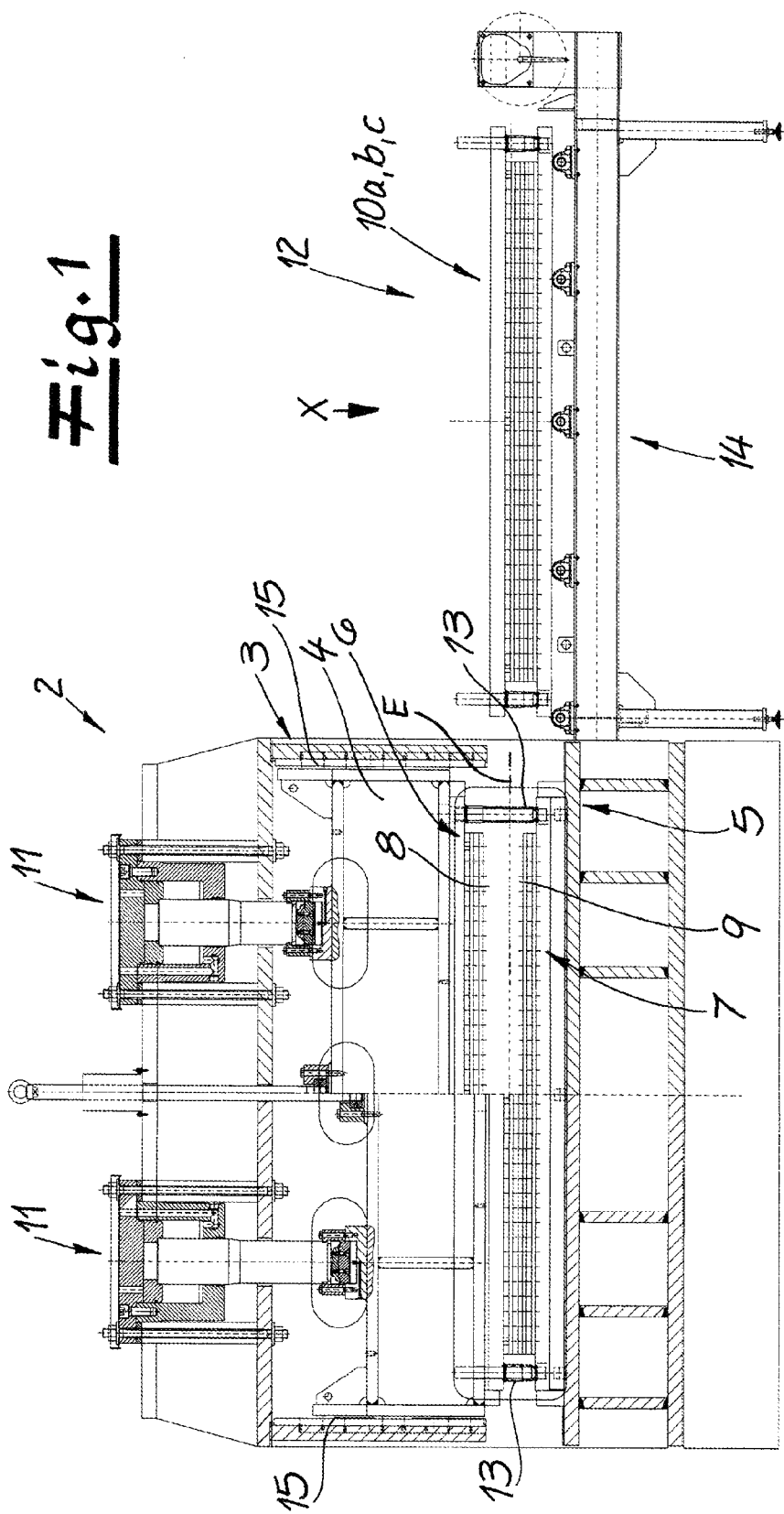

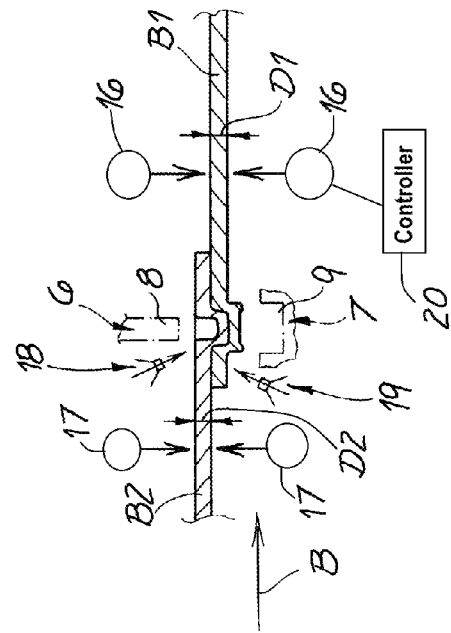
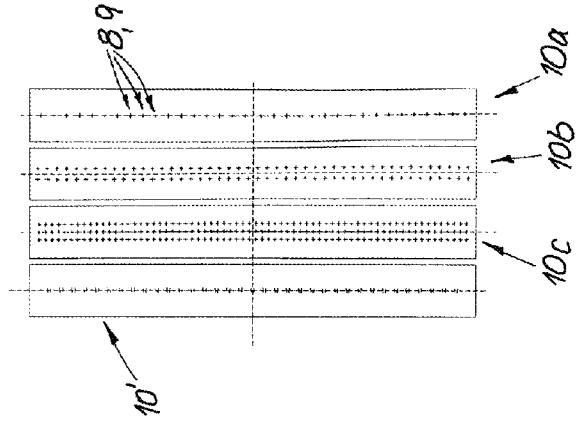
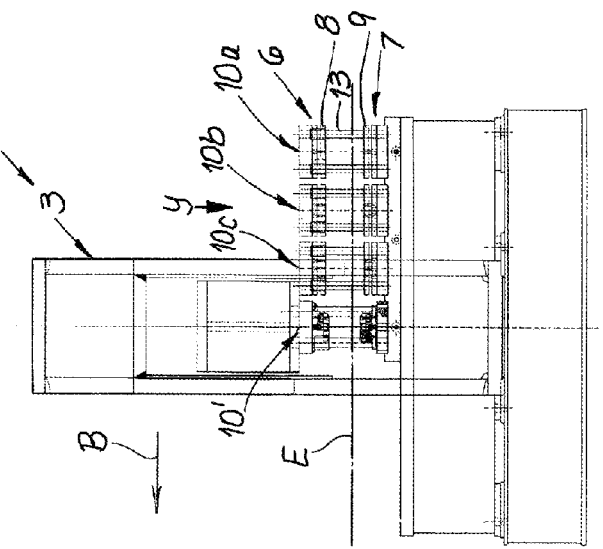

METHOD OF JOINING METAL STRIPS

FIELD OF THE INVENTION

The present invention relates to a method of joining metal strips. More particularly this invention concerns such a joining method for use in a strip-processing plant.

BACKGROUND OF THE INVENTION

It is frequently necessary in a strip-treatment plant to join or splice a trailing end of a leading metal strip to the leading end of a trailing metal strip. To do this, the trailing end of a leading strip and the leading end of the trailing strip are positioned one above the other to form an overlap and then are joined together at several points at the overlap by clinching without severing the strip and consequently without any cutting.

In a strip-treatment plant or strip process line, strips rolled up into bundles (coils) are usually unwound at the intake, then run through one or more treatment stations and optionally coiled up again at the output or, as an alternative, are cut into sheets. To avoid having to always rethread the strips, the leading end of a new bundle is joined to the trailing end of the strip of the last bundle. The strip joint is particularly important because defective strip joints can have a negative effect on further processing.

A wide variety of methods for joining strips are therefore known in practice, such a welding, punching and/or adhesive bonding (see EP 2,202,025 [U.S. Pat. No. 8,109,428] and EP 1,749,590 [2007/0029039], for example).

In practice, it has been found that strip joints can also be produced by clinching as an alternative to the traditional method, also known as clinching. Clinching is a method of joining metal strips and/or sheet metal without the use of an additional tool. A clinching tool usually consists of one or more punches and dies. The strips to be joined are pressed by the punch into and/or against the die, as is done in deep drawing with plastic deformation. The strips are joined to one another in a form-fitting (and force-locking) manner without the use of rivets. Due to the design of the dies and punches, the materials undergo a flow in width in and/or on the die, so that a form-fitting connection is implemented—much as in the case of a rivet connection—but without using separate rivets. Clinching within the context of the present invention denotes a type of joining without severing and consequently without cutting.

Such a method of the above-described type is known from WO 2014/033037 [US 2015/0121678], where the joining points are created by clinching as part of the strip-joining process, with an array of joining points extending transversely to the strip-travel direction, forming one or more rows of joining points. It is advantageous if the tool(s) is (are) positioned in a controlled manner.

The known method of joining strips by clinching without severing the strip has proven successful in practice but it could be refined. This is where the present invention begins.

OBJECTS OF THE INVENTION

It is therefore an object of the present invention to provide an improved method of joining metal strips.

Another object is the provision of such an improved method of joining metal strips that overcomes the above-given disadvantages, in particular with which metal strips can be joined universally, easily and with a high quality.

SUMMARY OF THE INVENTION

A trailing end of a leading metal strip is joined to a leading end of a trailing metal strip by first overlapping the leading end of the trailing strip with the trailing end of the leading strip and then clinching the ends together at the overlap by pressing at least one punch of a joining tool into one of the strips at the overlap sufficiently to complementarily deform both of the strips. The thickness of the leading and trailing ends is measured and a depth of engagement of the punch into the strips is controlled in accordance with the measured thickness.

Thus the invention teaches that in a generic method the thickness of the trailing end of the leading metal strip and/or the thickness of the leading end of the trailing metal strip is/are measured before joining them, and the clinching operation is controlled with or without feedback as a function of the measured thickness value(s). The clinching is performed using a clinching tool that has punches and dies.

According to the invention, the depth of penetration of the punch(es) into the material is controlled as a function of the measured thickness of the strip(s), for example, with position control. The invention is based on the discovery that, for the quality of a strip joint, it is particularly important that the joint is created without severing the strip and consequently without any cut edges. This presupposes that the punch does not penetrate into the material to an excessively great extent. On the other hand, for creating a satisfactory and tight connection, it is important for the punch to penetrate into the material to a sufficient extent that, as a result, the depth of penetration of the punch into the strips is particularly important. For this reason, it is basically possible to perform the joining operation as a position-controlled operation.

According to the invention, in addition or as an alternative to position regulation, it is possible to implement control, with or without feedback, of the joining operation as a function of the actual thickness of the metal strips. In practice, it has been found that the strips to be joined deviate in thickness from the stated/assumed values and/or from the ideal values. Since there is now a determination of the actual thickness of the metal strips according to the invention, it is possible to ensure, in the course of the joining operation, that the joining operation is always carried out with an optimal depth of penetration. It is especially preferable for both the thickness of the trailing end of the leading strip and the thickness of the leading end of the trailing strip to be measured. The thickness measurement(s) may be performed by laser thickness measurers, for example.

Since a thickness measurement is performed according to the invention, it is also no longer necessary to cut off the trailing ends and/or leading ends of the strips, which might have greater thickness deviations, for example, excess thickness, in advance, but instead the strip joint can be created in regions that may optionally be cut out later anyway as scraps.

The strip thickness(es) is (are) measured before the joining operation, namely preferably separately for each of the two strips. Alternatively, it is also within the scope of the invention to measure the total thickness of strips (before the joining operation) lying one atop the other. It is possible to measure the thickness(es) in the vicinity of or in/on the joining apparatus. Alternatively, however, the measurement may also take place at another location, for example directly downstream of the decoiler.

It is advantageous if the leading end of the trailing strip and the trailing end of the leading strip and/or the clinching tool is/are positioned so that no punch of the joining tool strikes any of the strip edges and/or if one or more side punchings is/are carried out before or after the connection of the strips at one or both strip edges.

The invention is based on the discovery that satisfactory clinch points must be created in order to avoid problems after the strips have run through other components of the system, and it is necessary to avoid a clinch point being created and/or present at a strip edge. For example, if a clinch point is created at an existing strip edge, shredding may occur at the edge of the strip in the case of such an unclean clinch point, depending on the degree of coverage of the strip edge by the punch. Particles may break off later in this region as it passes through the strip treatment line, and these particles may then adhere to the rolls, for example, and lead to dents in the strip. Consequently, measures are taken according to the present invention to prevent a clinch point from being formed or extending to a strip edge.

Therefore, according to the invention, there is the possibility that, even in the course of the positioning of the leading end of the trailing strip and/or the trailing end of the leading strip and/or the positioning of the tool, it is ensured that no punch of the joining tool will strike any of the edges of the strip.

Alternatively or additionally, the invention proposes that one or more side punchings and/or punched-out areas are created at one or both edges of the strip. Punching out areas in metal strips is basically known in practice. Thus, for example, it may be expedient to create side punchings when joining strips of unequal width, for example, when the new strip is wider than the old strip, because the wider corners of the new strip could become stuck in the line, for example at squeeze rolls. To prevent this, in this case the corners are punched off obliquely, namely using a trapezoidal or semi-circular punch tool. According to the present invention, there is now the option of creating side punchings after joining the strips, namely with the provision that no joining point is cut by the punching.

Alternatively, there is the possibility of carrying out one or more side punchings even before joining the strips. This is useful, for example, when there is the risk that a clinch punch might strike the edge of the strip. In this case, the side punchings may be created before joining the strips, with the provision that dependence of the tool geometry and the strip width will prevent a tool punch from striking a strip edge.

Apart from the possibility already mentioned above that the trailing end of the leading strip and the leading end of the trailing strip are centered in the system, there is the possibility that only one of the strips is centered relative to the other strip. Both strip ends and/or both strips may then lie outside of the center of the system. Then the clinching tool is displaced transversely so that its center axis matches that of the strip ends. There is then again the possibility mentioned above of preventing a clinch point from being located at the strip edge.

There is optionally the possibility of the clinching tool remaining in a fixed position at the center of the system. The positions of the two strips are measured relative to the center of the system. In this way, one knows where the clinch points are in the two joined strip ends. The side punching is now performed per side, so that no clinch point is punched. In the case when trimming is also performed in the line, the punch depth per side will be greater accordingly, but again in such a way that no clinch point is punched.

According to another aspect of the invention it is optionally proposed that the strips are lubricated before and/or during clinching. Oiling the parts being joined during clinching is basically known in order to minimize tool wear in clinching and to maximum lifetime. In practice, however, it has been found that oiling is not favorable for the deep drawing process in clinching. This is related to the fact that oiling reduces the friction of the parts being joined, i.e. the strips, and can have negative effects on the quality of the joint and/or its strength.

Against this background, the invention now preferably proposes that only the upper face of the metal strip at the overlap on the top and the lower face of the metal strip on the bottom are lubricated. Thus, the oiling takes place exclusively onto the strip on the bottom from underneath and onto the strip on the top from the upper, so there is no oiling between the two strip surfaces. This makes it possible to avoid the problems observed in practice in a simple and reliable manner and nevertheless tool wear can be minimized and lifetime maximized.

The method according to the invention is suitable for a wide variety of metal strips, for example, strips made of aluminum and/or an aluminum alloy or copper and/or a copper alloy. Basically, the conventional strips, for example, annealed metal strips are included, but it is also within the scope of the invention for unannealed metal strips to be joined to one another.

For clinching it is necessary and/or expedient for the parts being joined to have a good ductility and/or a good shaping capability under pressure and tensile stress. Therefore, in practice it has so far been assumed that only sheet metal and/or strips having a high elongation at break are suitable. For this reason, when joining aluminum strips, clinching has so far been limited to annealed aluminum strips, and the invention of course includes the connection of annealed metal strips. However, experiments have now surprisingly shown that even cold-rolled unannealed metal strips, such as aluminum strips, can be joined with a sufficient quality by clinching. Experiments have shown that clinching of a high quality can be achieved even if the stretch-to-break $A_{80}$ is only 6% or less. The stretch-to-break in a tensile test is the difference between the measured length after break and the starting measured length, based on the starting measured length, and the stretch-to-break is given in percentage. Since the value of the stretch-to-break is jointly determined by the ratio of the measured length to the cross section of the specimen, the stretch-to-break is characterized more specifically by a corresponding index, such that in the present case, the stretch-to-break $A_{80}$ is based on a tensile test at a measured length of 80 mm of the specimen. With metal strips whose stretch-to-break $A_{80}$ amounts to 2% to 5%, for example, approximately 3% to 4% can therefore be used. Consequently, according to the invention, a satisfactory strip joint exists not only with annealed metal strips but also with cold-rolled unannealed metal strips. The metal strips may be, for example, strips of aluminum and/an aluminum alloy or copper or a copper alloy. The fact that the strip joining is implemented by a plurality of joining points is of particular importance. Preferably at least 30 connection points are implemented per meter of strip width for the respective strip joint, for example, at least 40 joining points, especially preferably at least 50 joining points, per meter of strip width. Because of the large number of joining points, which create the strip joint, one may accept the fact that individual clinch points will tear. The invention starts with the discovery that, when joining unannealed cold-rolled metal strips, for example, it is possible to work in a limit range in which individual clinch points may perhaps tear. However, this does not have a significant negative effect on the stability of the strip joint because of the multitude of clinch points, so that the method according to the invention can be implemented in practice even with unannealed cold-rolled metal strips. The plurality of joining points can be in a row of joining points, with a plurality of joining points distributed over the strip width or especially preferably also in rows of joining point one after the other in the strip-travel direction. One or more rows of joining points can be created at the same time with just a single press stroke. To this extent, it is possible to rely on the discovery presented in WO 2014/033037.

In an optional embodiment of the invention, the strips are joined to one another by tempered clinching. It is then provided that the metal strips to be joined are heated before and/or during the joining. It is therefore possible to preheat the strips themselves using a suitable tempering oven and then to clinch them. Alternatively or additionally, the tempering may also take place by the clinching tools per se. There is therefore the possibility to heat the upper and/or lower tool, so that the strip is then heated under contact pressure and is then shaped. To do so, it may be expedient to work with an flat die and/or a flat counter tool, and the counter tool and/or punch can be heated. In heating the strips by one or both tools, it may be expedient to press the strips together using suitable means, for example a clamp or the like before clinching and/or pressing. There is thus the possibility of pressing the strips against the (heated) counter surface using a hold-down device, so that the connecting region is heated. Next, the clinching is performed with the help of the punch. However, contact pressure may be achieved during heating, even with the tools and/or punches themselves. The strip are only fixed together in the (first) heating phase and the heating also takes place at the same time, and then they are joined in a (second) clinching phase.

In tempered clinching, it is expedient if the movable tool, for example the upper tool, is adjustable, so that the position is regulated, namely in particular when the punch must be positioned on the strip for the contact preheating in a heating phase. In the case of contact preheating with the help of the tool, it is also expedient if the contact pressure (during the heating) is adjustable as a function of the strip parameters.

Due to the tempering (heating) of the metal strips, their shapability and/or their forming capacity is/are increased, so that the joining process can be optimized. This is advantageous in particular when joining brittle materials, because the formability of brittle materials can be improved by tempering. On the whole, the tempering can be advantageous with certain materials or material combinations. The development of cracks can be prevented.

The subject matter of the invention is also an apparatus for joining metal strips using a method of the type described here. This apparatus has a joining press with a press frame, a press upper part and a press lower part, and an upper tool with at least one punch (or one die) for clinching is provided on the upper press part and a lower tool having at least one die (or one punch) for clinching is mounted on the press lower part, and the press upper part and/or the press lower part can be moved relatively for applying a pressing force with one or more actuators (toward one another). There is thus the possibility of moving the press upper part together with the upper tool toward the stationary lower tool or vice versa with the help of actuators. The actuators may be hydraulic press cylinders, for example. In particular it is also possible to rely on existing designs of punch joining presses. High pressing forces can be applied, so that not only individual joining points but at the same time a plurality of joining points can be set, in particular one or more complete rows of joining points. It is thus provided that the upper tool is designed with a plurality of punches (or dies) distributed over the strip width and the lower tool may be a multiple tool having a plurality of dies (or punches) distributed over the width of the strip. According to the invention, one or more thickness measurers are provided that can measure the thickness of the trailing end of the leading metal strip and/or the thickness of the leading end of the trailing metal strip. To do so, a controller may be provided that controls, with or without feedback, the clinching operation as a function of the measured thickness. In addition, a punching device may be provided that can carry out one or more side punchings before and/or after joining the strips. Optionally or in addition, one or more oilers may also be provided for the strips or for the tools.

Taking into account the fact that the apparatus can optionally be adapted to different strips and in particular different strip thicknesses, a tool changer having a plurality of upper tools and a plurality of lower tools (and, consequently, a plurality of tool sets) is preferably provided, this tool changer optionally being shiftable from a working position inside the press to a maintenance position outside of the press and vice versa. With the help of the tool changer, it is possible to make available a plurality of clinching tools and/or tool sets, so that there can be a simple adaptation of the machine to the respective givens, in particular to different strip thicknesses. In addition, there is the possibility of equipping the tool changer with additional (traditional) punching tools, so that the machine can also be retooled into a punching device as needed.

As already explained above, the tools for clinching usually include punches, on the one hand, and dies, on the other hand. The die may be, for example, a contoured and/or profiled die that may be complementary to the punch. However, in the context of the present invention, "die" also means an uncontoured flat die and, consequently, a flat counter tool, so that it also includes "dieless" clinching methods.

BRIEF DESCRIPTION OF THE DRAWING

The above and other objects, features, and advantages will become more readily apparent from the following description, reference being made to the accompanying drawing in which:

FIG. 1 is a vertical section through a first embodiment,

FIG. 4 is a side view of the second embodiment of FIG. 3, FIG. 5 is a simplified view taken in direction Y through the second embodiment of FIG. 7, and FIG. 6 is a simplified view of the clinch connection with strip thickness measurement.

SPECIFIC DESCRIPTION OF THE INVENTION

As seen in FIG. 1 an apparatus for joining metal strips, namely for joining a trailing end of a leading metal strip to a leading end of a trailing metal strip is preferably integrated into a strip-treatment plant (strip processing line), for example, into the intake of such a strip processing line where coiled metal strips are unwound at the intake, then passed through different treatment stations and coiled up again at the output or processed further in some other way.

In order to avoid having to rethread the metal strips, the leading end of the trailing strip of a new coil is joined to the trailing end of the strip of the last coil. To do so, the leading end of the trailing strip and the trailing end of the leading strip are positioned one above the other to form an overlap and are clinched together at the overlap at several joining points. Such joining methods are basically known. The metal strips are not shown in FIGS. 1 through 5, only a strip plane E is shown.

According to the invention, the joining points are created by clinching without a cutting component (clinching). To do so, the apparatus has a joining press 2 with a press frame 3, a press upper part 4 and a press lower part 5. The travel direction B of the strip is shown in FIG. 4, while in FIGS. 1 and 3 it is perpendicular to the plane of the view.

Figure 3:
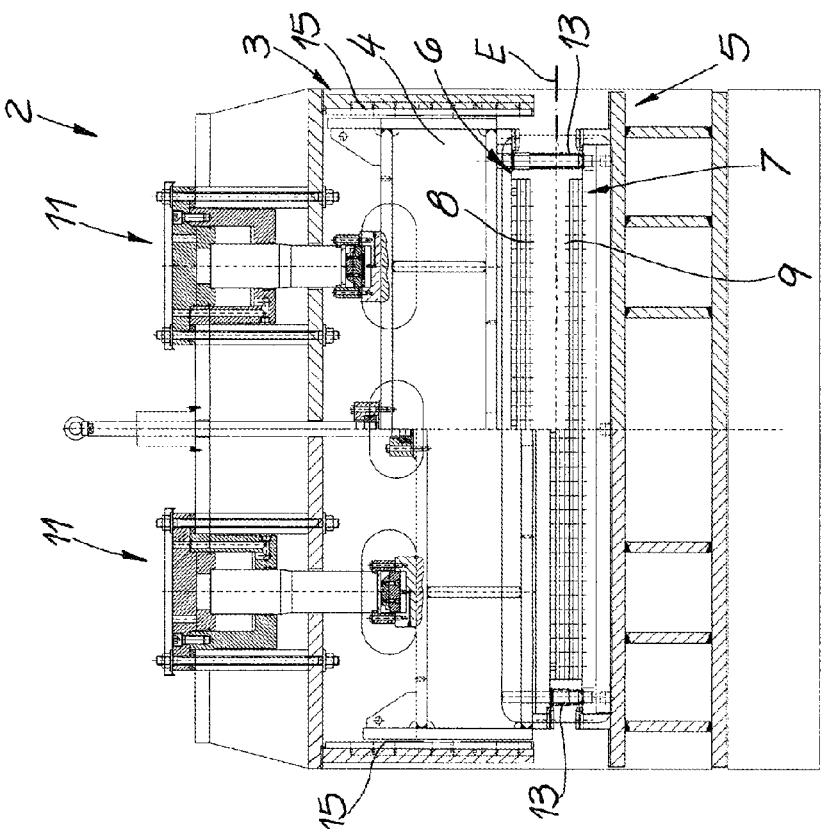
FIG. 3 is a vertical section through a second embodiment.

An upper tool 6 having a plurality of punches 8 for clinching is mounted on the press upper part 4. A lower tool 7 having a plurality of dies 9 for clinching is mounted on the press lower part 5. The upper tool 6 and its punches 8 and the lower tool 7 and its dies 9 form tool sets 10*a*, 10*b*, and 10*c*. The upper tool 6 and the lower tool 7 are each multiple tools, each having an array of punches 8 and dies 9 extending across the width of the strip. In the embodiments shown here, the press upper part 4 can be moved by actuators 11 against the stationary press lower part 5 to apply the pressing force. In this embodiment, the actuators 11 are hydraulic cylinders 11 whose pistons are joined to the movable press upper part 4 and are supported on a stationary upper cross beam of the press frame 3. FIGS. 1 and 3 show the press 2 in a divided diagram, closed in on the left half and open on the right half. The press upper part 4 is movable in guides 15 on the press frame 3.

The embodiments shown here are each equipped with a tool changer 12 carrying a plurality of tool sets 10*a*, 10*b*, and 10*c*, each consisting of an upper tool 6 and a lower tool 7. This tool changer 12 and the individual tool sets 10*a*, 10*b*, and 10*c* can optionally be moved from a working position inside the press into a maintenance position outside of the press and vice versa. In this way, there is the possibility of exchanging the tools and adapting the apparatus to the desired requirements, for example, to the strip thickness because different tools are preferably used for joining certain strip thicknesses.

Figure 2:
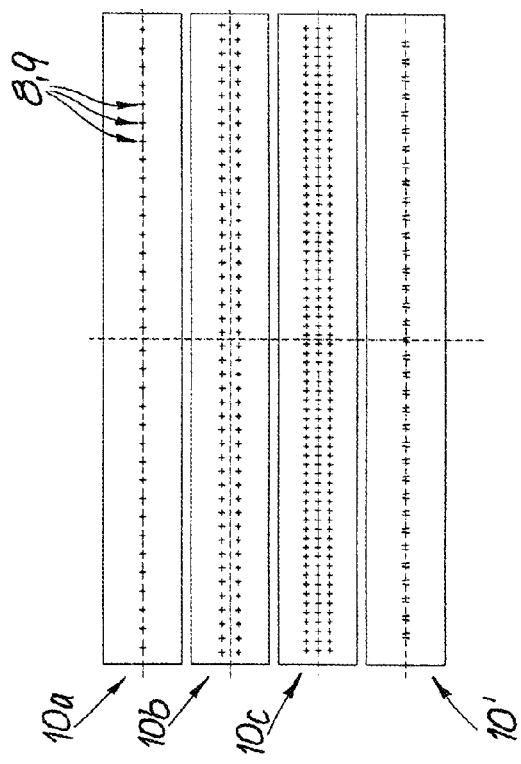
FIG. 2 is a simplified view taken in direction X of the first embodiment of FIG. 1.

FIGS. 1 and 2 on the one hand and FIGS. 3 through 5 on the other hand show two different tool changers 12.

FIGS. 1 and 2 show a first embodiment in which the tools 6, 7 are moved by the tool changer 12 from the working position into the maintenance position transverse to the travel direction B of the strip. To do so, the tool changer 12 in this embodiment is at the side of the press 2. It has a changing table 14 with the plurality of tool sets 10*a*, 10*b*, and 10*c* one downstream of the other in the strip-travel direction B. If the tool in the joining press 2 is to be replaced, it is pulled (or pushed) out of the press transverse to the strip-travel direction B and onto the changing table 14. The changing table 14 then travels in the strip-travel direction, for example, to a position so that another tool can then be pushed (or pulled) into the press 2 transverse to the strip-travel direction B.

In the simplified upper view in FIG. 2, it can be seen that, in the embodiment shown here, four different tools or tool sets 10*a*, 10*b*, and 10*c*, 10' are in the tool changer 12. Three tool sets 10*a*, 10*b*, and 10*c* are provided for clinching, with which one, two, or three rows of joining points can be set. Consequently, the leading tool set 10*a* has one row of punches 8 and dies 9, while the trailing tool set 10*b* has two rows of punches 8 and dies 9 one after the other in the strip-travel direction B, and the third tool set 10*c* has three rows of punches 8 and dies 9 one after the other in the strip-travel direction, so that one, two or three rows of joining points may optionally be set with a single press stroke, depending on which tool 10*a*, 10*b*, and 10*c* is in the press 2.

In addition, an additional tool set 10' is provided, designed as a punching tool 10', so that the press can also be retrofitted easily for a different punching connection. It is clear that different tool sets can be used for different strip thicknesses and/or strip thickness ranges, for example, and the individual tool sets 10*a*, 10*b*, and 10*c* usually have different point diameters and/or punch diameters. For thin strips, small point diameters are generally used, and a relative large number of joining points are then set. For thick strips, large point diameters are used and then, as a rule, fewer points can be set.

It can be seen here that the upper tool 6 and the lower tool 7 are joined to one another to form the tool sets 10*a*, 10*b*, and 10*c* by guides 13. This embodiment has guide columns 13 that ensure that the punches 8 of each upper tool 6 are effectively combined with the respective dies 9 of the respective lower tool 7. Each tool set has a total of four guide columns 13 on the corners. This is equally true of the embodiment according to FIGS. 1 and 2 and for the embodiment according to FIGS. 3 and 4.

Whereas the tool sets 10*a*, 10*b*, and 10*c* and/or 10' in the embodiment according to FIGS. 1 and 2 can be replaced transverse to the strip-travel direction B, FIGS. 3 through 5 show a second embodiment in which the tool sets 10*a*, 10*b*, and 10*c* and/or 10' are moved in the strip-travel direction B for the exchange. The individual tool sets are positioned one after the other in the strip-travel direction B, but in this case they are not offset laterally relative to the joining press 2 but instead are offset in the strip-travel direction. Nevertheless, the passage of the metal strip is not disturbed because the upper tools 6 are always above the metal strip and/or the strip plane E and the lower tools 7 are always below the metal strip, and since the guide columns 13 are always outside of the strip-travel region. In this embodiment, the tool sets 10*a*, 10*b*, 10*c* and 10' can also be replaced when the strip is in the machine. FIG. 4 shows a view in which the punch tool 10' is in the machine, for example.

To be able to exchange the tool sets 10*a*, 10*b*, and 10*c*, 10', changing actuators are usually provided, for example, hydraulic actuators that are not shown in detail in these figures.

In FIGS. 2-5 the tools can simultaneously create a plurality of joining points spaced a distance apart transverse to the strip-travel direction B, thereby forming at least one row of joining points extending over the full width of the strip or almost over the full width of the strip. Depending on which of the tools is used, a plurality of rows of joining points one after the other in the strip-travel direction can also be created at the same time. Thus, there is the possibility of creating the entire strip joint with a single press stroke with a plurality of rows of joining points. The joining press can exert sufficient pressing force with the hydraulic cylinders 11.

The principle of the clinch connection according is illustrated as an example and in simplified form in FIG. 6 that show the trailing end of a leading metal strip B1 and the leading end of a trailing metal strip B2 and the overlap at which the joining points are formed by clinching using the clinching tools 6 and 7. A clinch connection without cutting is shown here. It can be seen in FIG. 6 that the thickness D1 of the trailing end of the leading metal strip B1 can be measured by using a downstream thickness measurer 16, and the thickness D2 of the leading end of the trailing metal strip B2 can be measured by using an upstream thickness measurer 17, namely before joining the strips. These thickness measurers 16, 17 may be optical thickness measurers, for example using laser radiation. There is then the possibility of controlling, with or without feedback, the joining operation as a function of the measured thickness and/or of the measured thicknesses D1, D2, with the help of these thickness measurers 16, 17, namely by using a controller 20. In this embodiment, the thickness measurers are in the immediate vicinity of the joining tools and can be integrated into the joining apparatus. However, the invention also includes embodiments where the thickness measurers are elsewhere in the strip-treatment plant. Thus for example a thickness measurer may be directly downstream of a decoiler in order to measure the thickness of the leading end of the trailing strip there, and the corresponding signal and/or the corresponding output can then be processed when the strips are being joined.

There is also the possibility of lubricating the strips using oilers 18, 19. In this embodiment, at the overlap, only the upper face of the metal strip B2 situated on the top and the lower face of the metal strip B1 situated on the bottom are lubricated. Optionally and additionally, there is the possibility of oiling the corresponding tool surface area.

The options shown in FIG. 6 may be used individually or in combination, for example in an apparatus according to FIGS. 1 through 5, but as an alternative also with apparatuses with different designs

We claim:

1. A method of joining a trailing end of a leading metal strip to a leading end of a trailing metal strip, the method comprising the steps of:
   measuring a thickness of the leading end of the trailing strip;
   measuring a thickness of the trailing end of the leading strip; and thereafter
   overlapping the leading end of the trailing strip with the trailing end of the leading strip;
   clinching the ends together at the overlap by pressing at least one punch of a clinching tool into one of the strips at the overlap sufficiently to complementarily deform both of the strips at a plurality of joining points; and
   controlling a depth of engagement of the punch into the strips in accordance with the measured thicknesses.

2. The method defined in claim 1 wherein the clinching tool has a plurality of punches, the method further comprising the step of:
   positioning the leading end of the trailing strip and the trailing end of the leading strip or the clinching tool so that no punch of the clinching tool strikes an edge of the strips at the overlap.

3. The method defined in claim 1 wherein the clinching tool has a plurality of punches, the method further comprising the step of:
   positioning the leading end of the trailing strip and the trailing end of the leading strip such that one or more side punchings are made at one or both edges of the strips before or after joining the strips.

4. The method defined in claim 3, wherein the side punchings are effected before joining the strips such the tool geometry and the width and position of the strips prevent the punch from striking an edge of the strip.

5. The method defined in claim 3 wherein the side punchings are created after joining the strips such that none of the joining points is cut by the side punchings.

6. The method defined in claim 1, further comprising the step of:
   lubricating only an upper face of the metal strip on the top and the lower face of the metal strip on the bottom at the overlap prior to joining the strips.

7. The method defined in claim 1, wherein the strips are joined at least at 30 joining points.

8. The method defined in claim 1, wherein the thicknesses are measured by respective thickness measurers in the immediate vicinity of the clinching tool.

\* \* \* \* \*